Sept. 4, 1956  P. J. GUNAS  2,761,476
ADJUSTABLE CORNER CLAMP
Filed Sept. 28, 1953
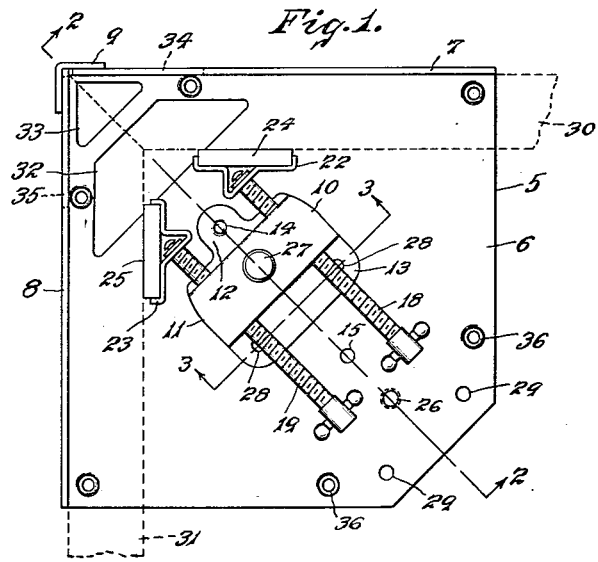
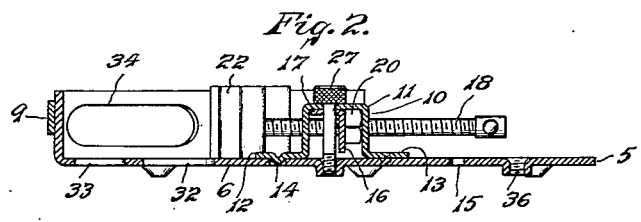
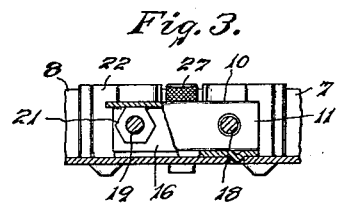
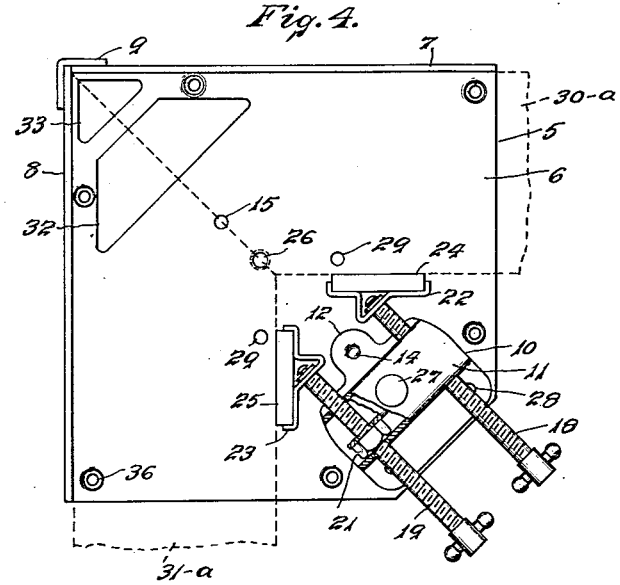
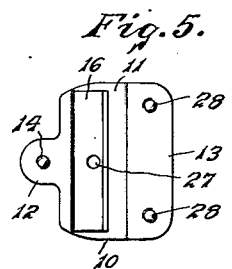
INVENTOR.
PETER J. GUNAS.
BY
Louis V. Lucia
ATTORNEY.

United States Patent Office 2,761,476
Patented Sept. 4, 1956

2,761,476

ADJUSTABLE CORNER CLAMP

Peter J. Gunas, Manchester, Conn.

Application September 28, 1953, Serial No. 382,546

3 Claims. (Cl. 144—293)

This invention relates to an adjustable corner clamp and more particularly to a device for clamping the corners of frames for pictures and the like so as to hold the adjacent side members of such frames in position at the correct angle, with relation to each other, while they are being secured together; such a device being clearly shown and described in the co-pending application of Peter R. Tierney, Serial No. 269,165, filed January 31, 1952, and now abandoned.

The primary object of the present invention is to provide a corner clamp in which the clamping means are carried on a member that is adjustable on the base of the clamp to thereby enable the clamp to accommodate side members in a wide range of widths.

A further object of the invention is the provision of a corner clamp which is adapted to accommodate members in a range of widths which is larger than the overall travel of the clamping means relatively to their supporting member.

Another object of the present invention is to provide such a corner clamp having certain novel improvements for more securely holding the side members of the frame in position to be joined together and thereby rendering the clamp more efficient in its operation.

A still further object of this invention is the provision of a corner clamp having a separate clamping screw for each of the side members so as to facilitate positioning of said side members with relation to each other.

Further objects and advantages of the present invention will be more clearly understood from the following description and the accompanying drawings in which:

Fig. 1 is a plan view of a corner clamp embodying my invention.

Fig. 2 is a sectional side view on line 2—2 of Fig. 1.

Fig. 3 is a sectional rear view on line 3—3 of Fig. 1.

Fig. 4 is a plan view similar to Fig. 1, but showing the clamping members in a different position for clamping side members of a frame which are of a different size.

Fig. 5 is a bottom view of the anchoring member for the clamping screws.

As illustrated in the drawings, my improved corner clamp includes a frame 5 having a flat base portion 6 with perpendicular upstanding flanges or walls 7 and 8 at the adjoining sides thereof; the said walls being preferably upturned from the material of the base and joined together by means of an overlapping corner plate 9 in order to strengthen them.

An anchoring member 10 is provided on said base and is preferably constructed of sheet metal which is bent upwardly, to form an inverted U-shaped portion 11, and laterally to provide foot flanges 12 and 13 that rest upon the base 6. The said flange 12 has a downwardly extending projection 14 which fits in any one of a series of holes 15 in the base 6.

Within the inverted U-shaped portion 11 there is provided a positioning angle bar 16 having a flange 17 which is secured against the underside of the U-shaped portion 11.

The anchoring member 10 has two separate pairs of holes in the opposite vertical wall portions thereof through which extend the clamping screws 18 and 19. The said screws also extend through aligned holes in the angle bar 16. Nuts 20 and 21 are threaded to the screws 18 and 19, respectively, and are located within the U-shaped portion 11 and between the outer side wall thereof and the vertical portion of the angle bar 16.

The said clamping screws 18 and 19 are provided at their ends with work-engaging clamping members 22 and 23, respectively, which are rotatably secured to the ends of the clamping screws and each of said clamping members has a suitable pad 24 and 25, respectively, for engaging the side members of a frame or the like that are clamped in position within said corner clamp. The said pads are preferably constructed of a resilient material to prevent slippage and to cause them to firmly engage the side members of the frame without marring their surfaces.

In order to firmly secure the anchoring member 10 in different positions upon the base 6, so as to accommodate side members of different sizes, there is provided in said base and associated with the holes 15—15 a series of threaded holes 26—26 which are adapted to receive a securing screw 27 that extends downwardly through the top of the U-shaped portion 11 of the anchoring member.

The flange 13 of the anchoring member is also provided with downwardly extending projections 28—28 which are adapted to fit into a selected pair of holes 29—29 in the base 6 in order to more securely retain the said anchoring member against displacement upon the base 6 when it is secured in position by means of the screw 27.

The base portion 6 has openings 32 and 33, adjacent the corner between the walls 7 and 8 thereof, and separate openings 34 and 35 are provided in the said walls in order to render the abutting edges of the side members accessible for driving fastening members such as nails, brads, staples, or the like, into them and thereby fastening said members together while they are held in clamped position within by improved corner clamp. The said base is also provided with a plurality of countersunk holes 36—36 for receiving suitable screws when it is desired to fasten the corner clamp to the surface of a work-bench or the like.

In the use of the above described corner clamp, the side members of a frame, indicated in dotted lines at 30 and 31, are first mitered and then placed within the clamp against the side walls 7 and 8. If the side members are of a narrow width, such as those indicated at 30 and 31, the anchoring member 10 is placed in the forward position on the base 6. If, however, said side members are of a width such as those indicated at 30-a and 31-a and cannot be acommodated by the clamping members when the anchoring member is in its forward position, said anchoring member is placed in its rearward position on the base 6 as illustrated in Fig. 4. In either of said positions said anchoring member is properly positioned by the projections 14 and 28—28 thereon which extend into their respective holes 15 and 29—29 in the base and is retained in position by the screw 27 which is received in the hole 26.

The clamping screws 18 and 19 are then rotated until their respective pads 24 and 25 engage the side members. By independently rotating the said clamping screws, the side members can be firmly clamped against their respective walls 7 and 8 and they may also be adjusted with relation to each other so as to provide an accurate corner joint between them. When the said side members are thus clamped together, fastening members, such as brads, staples and the like, may be driven into them through the openings 32 and 33 in the base and openings 34 and 35 in the side walls. Such fastening members may also be driven into the fronts of the side members since they are always accessible from the open side of the clamp.

It will be understood from the above description that in my improved corner clamp, the provision of the adjustable anchoring member 10 which carries the clamping screws enables the corner clamp to receive work pieces in a range of widths which is greater than the travel of the clamping screws 18 and 19 which would ordinarily limit the capacity of the clamp if the anchoring member were permanently secured to the base.

It will be further understood that my present invention provides an improved corner clamp capable of receiving side members of different widths since I have provided separate clamping screws which are adjustable to different relative positions. Said separate clamping screws also permit the side members of a frame or the like to be moved with relation to each other so as to accurately position them and thereby provide a satisfactory corner joint.

I claim:

1. A corner clamp constructed of sheet metal and comprising a base having upstanding walls along two adjoining sides thereof forming a corner on said base, an anchoring member constructed of sheet metal and comprising an inverted U-shaped portion having lateral flanges extending from the free edges thereof and forming feet for supporting said anchoring member, each of said feet having a downwardly extending projection, the said base having a series of holes for receiving said projections to position the anchoring member in different positions upon the base, a securing screw extending downwardly through said anchoring member, the said base having threaded holes therein for receiving said securing screw to secure the anchoring member in different positions upon the base, a pair of parallel and independently operable clamping screws extending through said anchoring member, a nut threaded to each of said clamping screws and contained within the inverted U-shaped portion of the anchoring member, and a separate abutment pad angularly positioned upon each of said clamping screws for separately engaging the side member of a frame and adjusting them relatively to each other to provide an accurate corner joint between them and clamping each of said side members in adjusted position with relation to an adjoining side member that is clamped by the other clamping screw.

2. A corner clamp as set forth in claim 1 including an angular bar within the U-shaped portion of the anchoring member for positioning the nuts therein adjacent to one side of the U-shaped portion of the anchoring member.

3. A corner clamp comprising a base having vertically extending walls along two adjoining sides thereof forming a corner on said base, said base having a plurality of similarly arranged groups of holes therein and each of said groups including a threaded hole, an anchoring member having a plurality of projections extending from the bottom thereof and adapted to be received in the corresponding holes in any one of said groups whereby said anchoring member is located in a predetermined position relatively to said corner and is prevented from moving over the surface of said base, a retaining screw carried by said anchoring member and adapted to be threaded to the threaded hole included in the group of holes receiving said projections whereby disengagement of said projections from said holes is prevented, and clamping means carried by said anchoring member for clamping the side members of a frame against said walls with the end portions thereof in abutting relation.

References Cited in the file of this patent

UNITED STATES PATENTS

| 121,851 | Cornish | Dec. 12, 1871 |
| 156,232 | O'Dell | Oct. 27, 1874 |
| 189,831 | Zimmerman | Apr. 17, 1877 |
| 1,246,466 | Reeves | Nov. 13, 1917 |
| 1,474,119 | Robertson | Nov. 13, 1923 |
| 1,954,708 | Mass | Apr. 10, 1934 |
| 2,415,259 | Renton | Feb. 4, 1947 |
| 2,478,828 | Larson | Aug. 9, 1949 |
| 2,723,692 | Tierney | Nov. 15, 1955 |

FOREIGN PATENTS

| 231,520 | Germany | Feb. 25, 1911 |
| 611,344 | Germany | Mar. 26, 1935 |